United States Patent
Kugler Viegas et al.

(10) Patent No.: US 11,258,753 B2
(45) Date of Patent: Feb. 22, 2022

(54) METHOD FOR DETECTION OF DNS SPOOFING SERVERS USING MACHINE-LEARNING TECHNIQUES

(71) Applicant: SAMSUNG ELETRÔNICA DA AMAZÔNIA LTDA., São Paulo (BR)

(72) Inventors: Eduardo Kugler Viegas, Campinas-São Paulo (BR); Martin Andreoni Lopez, Campinas-São Paulo (BR); Raphael Machado Monteiro, Campinas-São Paulo (BR)

(73) Assignee: SAMSUNG ELETRÔNICA DA AMAZÔNIA LTDA., Sao Paulo (BR)

(*) Notice: Subject to any disclaimer, the term of this patent is extended or adjusted under 35 U.S.C. 154(b) by 0 days.

(21) Appl. No.: 16/905,874

(22) Filed: Jun. 18, 2020

(65) Prior Publication Data
US 2021/0258279 A1 Aug. 19, 2021

(30) Foreign Application Priority Data
Feb. 13, 2020 (BR) ...................... 10 2020 003105 8

(51) Int. Cl.
*G06F 15/16* (2006.01)
*H04L 61/4511* (2022.01)
(Continued)

(52) U.S. Cl.
CPC .......... *H04L 61/1511* (2013.01); *G06N 20/00* (2019.01); *H04L 61/2007* (2013.01);
(Continued)

(58) Field of Classification Search
CPC ............. H04L 61/1511; H04L 61/2007; H04L 61/6009; H04L 67/02; H04L 63/1441; G06N 20/00
See application file for complete search history.

(56) References Cited

U.S. PATENT DOCUMENTS

2003/0070096 A1* 4/2003 Pazi .................... H04L 63/1458
726/4
2005/0044352 A1* 2/2005 Pazi ....................... H04L 63/08
713/153

(Continued)

FOREIGN PATENT DOCUMENTS

WO WO-2006108113 A2 * 10/2006 ....... H04L 29/12028

*Primary Examiner* — Richard G Keehn

(57) ABSTRACT

The present disclosure is related to the network communication technology field and relates to a method for the classification and recognition of the Domain Name System (DNS) server, using machine-learning techniques. The classification process assigns a given DNS server as belonging to a preset of classes. For example, it enables to label a DNS server as either benign or malicious. On the other hand, the recognition process seeks the identification of the DNS server behavioral profile, which, consequently, can be used to assess the DNS server trustworthiness before DNS responses can be reliably used, e.g. identification of well-known and trusted DNS servers. Hence, the present patent, by the means of detecting the DNS server RFC adherence improves user security through the classification and recognition of DNS characteristics. Therefore, security solutions can use the DNS server characteristics to assess its trustworthiness before DNS responses can be reliably used.

20 Claims, 5 Drawing Sheets

(51) Int. Cl.
*H04L 61/58* (2022.01)
*G06N 20/00* (2019.01)
*H04L 29/06* (2006.01)
*H04L 67/02* (2022.01)
*H04L 61/5007* (2022.01)

(52) U.S. Cl.
CPC .......... *H04L 61/6009* (2013.01); *H04L 63/12* (2013.01); *H04L 63/1441* (2013.01); *H04L 67/02* (2013.01)

(56) References Cited

U.S. PATENT DOCUMENTS

| | | | |
|---|---|---|---|
| 2017/0063932 A1* | 3/2017 | Hubbard | H04L 63/0861 |
| 2018/0019968 A1* | 1/2018 | Redekop | H04L 47/70 |
| 2018/0219833 A1* | 8/2018 | Reddy | H04L 61/1511 |
| 2020/0204581 A1* | 6/2020 | Manadhata | H04L 61/1511 |
| 2020/0213251 A1* | 7/2020 | Shah | H04L 67/12 |
| 2021/0006579 A1* | 1/2021 | Correa Bahnsen | H04L 63/1425 |
| 2021/0084071 A1* | 3/2021 | Mandrychenko | H04L 63/12 |
| 2021/0117529 A1* | 4/2021 | Zamora Mart nez | G06F 21/30 |

* cited by examiner

METHOD FOR DETECTION OF DNS SPOOFING SERVERS USING MACHINE-LEARNING TECHNIQUES

CROSS-REFERENCE TO RELATED APPLICATION(S)

This application is based on and claims priority under 35 U.S.C. § 119 to Brazilian Patent Application No. 10 2020 003105 8, filed on Feb. 13, 2020, in the Brazilian Intellectual Property Office, the disclosure of which is incorporated by reference herein in its entirety.

TECHNICAL FIELD

The present patent is related to the network communication technology field and relates to a method for the classification and recognition of the Domain Name System (DNS) server, using machine-learning techniques. More specifically, it describes a way to actively classify and recognize DNS servers. The classification process assigns a given DNS server as belonging to a preset of classes. For example, it enables to label a DNS server as either benign or malicious. On the other hand, the recognition process seeks the identification of the DNS server behavioral profile, which, consequently, can be used to assess the DNS server trustworthiness before establish a connection, e.g. identification of well-known and trusted DNS servers. Hence, the present patent, by the means of detecting the DNS server RFC adherence improves user security through the classification and recognition of DNS characteristics. Therefore, security solutions can use the DNS server characteristics to assess its trustworthiness before DNS responses can be reliably used.

BACKGROUND OF THE INVENTION

Domain Name System (DNS) servers are essential components for providing users proper Internet access. The main objective of DNS server is to provide to their client access to a database containing a relationship between domain names and their related IP addresses. To access such database, a client must perform a domain resolution query to the DNS server, which, as a counterpart, replies a related response. To enable such communication both client and server must communicate by the means of a proper DNS protocol implementation. Hence, the DNS protocol is defined using a public documentation as described in Request-For-Comments (RFC) documents.

A Request for Comments (RFC) is a numbered document, which includes appraisals, descriptions and definitions of online protocols, concepts, methods and programs. RFCs are administered by the Internet Engineering Task Force (IETF), which is a large open international community of network designers, operators, vendors, and researchers concerned with the evolution of the Internet architecture and the smooth operation of the Internet. The majority of the standards used online are published in RFCs. Some fundamental RFCs were officially adopted as standards. Nevertheless, a large proportion of RFCs are not granted "Standard" status but are still used as such all over the world. The term "device" is used herein to refer to a communicating device that enables end devices to have access to a network. Examples of devices include but are not limited to smartphones, smartwatches, smart TVs, among others.

The term "DNS server" is used herein to refer to a Domain Name System (DNS) server the device is currently performing its queries. The DNS server may reside within the LAN scope, i.e. same subnet as the device, or outside the LAN scope, i.e. not the same subnet as the device.

The term "DNS query" is used herein to refer to a domain resolution query performed by a device to a DNS server. A device generates the DNS query. The DNS query format follows the DNS protocol specification.

The term "DNS response" is used herein to refer to a domain resolution response after a DNS query was made to a DNS server. A DNS server generates the DNS response. The DNS response format follows the DNS protocol specification. Example of DNS query and DNS response include but are not limited to create a crafted query with special characters. In a normal behavior, the DNS response should response with a code equal to 5, meaning that the DNS query was rejected.

The term "feature" is used herein to refer to a property extracted from a message transmitted from a DNS server. The feature may be extracted directly from the property included in the DNS server message or extracted by the processing of several properties included in the DNS server message. The feature may also be extracted after the analysis of several DNS messages replied from a server. For example, a feature may be extracted from a DNS server message according to its flag values. As another example, a single feature may be extracted from several DNS server messages after the analysis of variations on specific field values.

The term "recognizer" is used herein to refer to a machine-learning algorithm that identifies similarities between its input and a set of known examples. The recognizer may rely on clustering, classification, distance-based or other machine-learning techniques. For example, a recognizer may use a distance-based algorithm to return the most similar DNS server for a given input, The term "classifier" is used herein to refer to a machine-learning algorithm that classifies an input into a class. The class refers to a group of a given examples that presents the same properties. For example, a classifier may label an input according to the software used by the DNS server, in such a case the property is regarding the DNS server software.

Currently, the majority of DNS servers' implementations rely on authentication-less, hence insecure, communication mechanisms to exchange data. Despite there are initiatives to provide secure DNS servers implementation such as DNSSEC, their adoption still beginning. Hence, DNS servers are often a target for attacks. For instance, an attacker may spoof a benign DNS server and redirect clients' domain resolution queries to malicious domains. Given that the client trusts the DNS server responses, s/he is not able to easily detect such attack. Therefore, benign users are subject to all sorts of attacks, such as connection eavesdropping, download of malicious content, stealing of credentials, among others. Besides, due to the easiness of setting a DNS spoofing attack, a plethora of DNS spoofing attack tools have emerged over the last years. Nonetheless, attackers can implement DNS spoofing attack tools very easily with very few lines of source code.

In a common attack scenario, an attacker connects to a public Wi-Fi network, performs a man-in-the-middle attack to connected users to redirect all network traffic, and then spoofs further DNS queries. In general, security mechanisms detect DNS spoofing attacks using a secondary DNS server, to validate the response of the primary DNS server. However, this kind of service is often paid, whilst attackers may also be able to spoof such queries. In addition, resource-restrained devices, such as smartphones, should care with the amount of data exchanged over the network, for energysaving purposes. Therefore, users are not able to identify the DNS server behavior they are connecting to. For instance, a DNS server that does not properly follow the DNS protocol RFC specification is more likely to be used for malicious purposes, since attackers often use simpler tools to spoof the benign DNS server.

Detection of spoofed DNS servers is typically achieved by employing a secondary DNS server for validation purposes. Hence, in general, it demands a third-party, which validates the DNS responses of the primary DNS server.

Prior art solutions are still unable to detect DNS spoofing servers. Therefore, client devices are exposed to a variety of threats. Over the last years, security solutions have been developed to improve user security regarding the network it connects to. In the current state of art, the following solutions and technologies can be found:

CISCO Adaptive Wireless IPS Software (https://www.cisco.com/c/en/us/products/wireless/adaptive-wireless-ips-software/index.html). A wireless intrusion prevention system released by CISCO. CISCO proposal enables the detection of several network attacks including DHCP (Dynamic Host Configuration Protocol) spoofing, ARP spoofing, among others. Those attacks are often used to enable a DNS spoofing scenario. According to their deployment guide, DHCP spoofing attack is detected through a whitelist according to the client sending the DHCP responses. CISCO solution is primarily designed for enterprise environments. In contrast, the present invention can be used in both enterprise and domestic environments, as it can be readily embedded in end-devices. In addition, CISCO solution demands a centralized entity for configuration purposes, while the present invention does not require any infrastructure designated to it. Also, Cisco solution demands policies to be configured for the detection task;

SNORT Intrusion Detection System. Snort rule-based intrusion detection system contains a set of rules used for detection of DNS spoofing attacks. The first set of rules detects DNS spoofing attacks according to the network packet TTL, in which network packets with TTL value as "1" are considered harmful. In contrast, the second set of rules detects DNS spoofing attacks according to the network packet IPV4 identification value, in which some DNS spoofing tools use hardcoded values. However, an attacker can easily evade both set of rules, by simply changing such values. In addition, SNORT approach is heavyweight, as it demands the analysis of all network packets. The present invention enables products to detect a wider variety of DNS spoofing tools in a more lightweight approach, by simply sending a set of specially crafted DNS queries;

Ettercap is a DNS spoofing tool commonly used for malicious purposes. The tool provides a plugin for detection of Ettercap tool in the network. Similar to SNORT, the plugin relies in the evaluation of all network packets to find specific network packet IPV4 identification value. Such technique can be easily evaded by simply changing such value in the DNS spoofing tool. The present invention enables devices to detect a wider variety of DNS spoofing tools in a more lightweight approach, by simply sending a set of specially crafted DNS queries;

Samsung MAX—Privacy Protection Feature. Samsung MAX provides a privacy protection feature, which enables users to utilize Internet connected to a Samsung VPN. The feature also enables users to select DNS server, which in its turn, should make users secure to DNS spoofing attacks. However, the tool increases user latency to his services, as a VPN must be used. In addition, such feature is free only for a limited amount of time. The present invention enables devices to detect malicious DNS servers without relying in either VPN or third party services.

DNS Security Extensions (DNSSEC). DNS Security Extension provides authenticity of DNS servers by leveraging a public key infrastructure. To fulfill such goal, each DNS server must maintain a private and public key pair, then, each record should be signed using the private key, while the client validates the response using the public key. However, although DNSSEC was introduced in 1997, its deployment remains low, and the existence of DNS spoofing attacks remains an open challenge. The present invention enables devices to detect malicious DNS servers without demanding a public key infrastructure to evaluate the DNS server authenticity.

The patent document US2019098049 (A1), entitled: "Network endpoint spoofing detection and mitigation", published on Mar. 28, 2019, describes a method for detection of spoofed hosts according to the estimated travel distance between source and destination. Said method detects spoofed hosts according to the difference between the estimated travel distance and actual travel distance.

The patent document CN104052755A, entitled: "DNS spoofing attack detecting and positioning system and method based on cloud platform", published on Sep. 17, 2014, describes a method for detection of spoofed hosts according to the estimated travel distance between the system and a positioning subsystem established in a different geographic location. Similar to the patent document US2019098049, this invention detects spoofed DNS server based on the travel distance estimation. In contrast, the method of the present invention detects spoofed DNS server hosts according to the host protocol behavior adherence. In addition, the method of the present invention includes machine-learning technique for classification and recognition purposes, while such documents simply compare estimated travel distance times.

The patent document US 20160359887(A1), entitled: "Domain name system (DNS) based anomaly detection", published on Dec. 8, 2016, describes a method for detecting anomalies in a DNS server. The method collects information from different sensors distributed on the network. An analytics and anomaly detection module analyzes sensors information to determine abnormal behavior between DNS messages exchanges. Different from the present invention, said patent document uses several external sensors distributed in the network, while the present invention performs the detection of spoofed DNS inside an end-device.

SUMMARY

The method of the present invention relates to a method for the classification and recognition of the Domain Name System (DNS) server, using machine-learning techniques. The method of the present invention actively extracts behavioral features by the means of exchanging query messages to validate if the DNS server adheres to the DNS protocol Request-For-Comments (RFCs), which is used for classification and recognition purposes. In this document, for easier understanding, we provide scenarios where the invention is applied. For the sake of simplicity, we consider a networked environment, in which a user connects to a network and queries a DNS server for domain name server translations.

For classification, the method enables the separation of the DNS server into categories, e.g. benign server application and malicious server application, thus, allowing the detection of spoofed DNS servers, improving user's security. Finally, when used for recognition purposes, the method enables the identification of the DNS server behavioral profile, which, consequently, can be used to assess the DNS trustworthiness before DNS responses can be reliably used, e.g. identification of well-known and trusted DNS servers. Therefore, such method can be used for the classification and recognition of malicious DNS servers before a device uses such server for further name resolution queries. The method can be used by any device that perform wireless or wired communication (e.g. mobile devices, Smart TVs, etc) as it does not require hardware changes, and presents a low computation demand.

The present invention method begins with a client that wishes to assess its DNS server reliability before DNS responses can be reliably used. To fulfill such goal, the client evaluates the DNS server adherence to the DNS protocol specification, as described in its RFC. To this end, the client sends a set of specially crafted DNS queries, in which each query is used to evaluate a specific RFC specification, then, according to the DNS server response a feature vector is built. The feature vector acts as a representation of the DNS server behavior. The number of performed queries determines the number of features, a flag is set as active in the feature vector when a query is answered, and otherwise the flag is set as inactive. Then, the DNS server behavior is used for classification and recognition purposes.

When used for classification purposes, the client relies in the DNS server behavioral profile to classify it as a given class. To this end, the client applies a machine-learning model, trained with a preset of categories. Therefore, the assigned class can be used to assess the DNS server reliability, e.g. a DNS server labeled as malicious DNS spoofing tool indicates a possible DNS spoofing server.

On the other hand, when used for recognition purposes, the client uses the DNS server behavioral to assess the DNS trustworthiness before DNS responses can be reliably used. Thus, the client also relies in machine-learning schemes to aid the identification of well-known and trusted DNS servers' profile. Here, the assigned class obtained during the classification and the trust level obtained during the recognition can be employed to assess the DNS server trustworthiness before the user even use it for domain resolution purposes. This way, the present invention provides a method to actively establish the DNS server trustworthiness, and therefore, significantly improving the user security.

The method proposed by the present invention can be applied to the majority of electronic communication devices, such as smartphones, Smart TVs, among others. In addition, no hardware changes are required for the classification, and recognition tasks. As previously stated, the invention is lightweight and can be embedded in resource-constrained devices, such as wearable devices, with little or no battery impact.

BRIEF DESCRIPTION OF DRAWINGS

The objectives and advantages of the current invention will become clearer through the following detailed description of the example and non-limitative drawings presented at the end of this document:

FIG. 5 shows an illustrative embodiment of the present invention.

DETAILED DESCRIPTION

Advantages of the Invention

Figure 1:
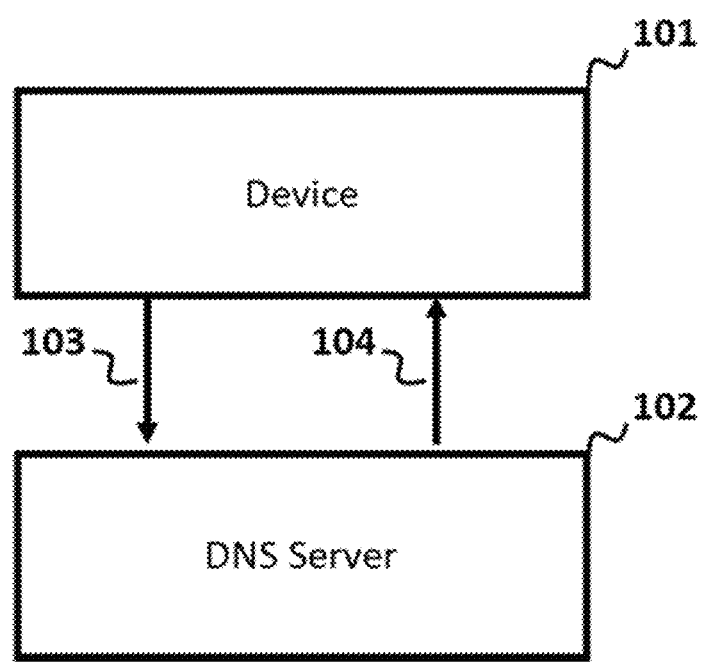
FIG. 1 shows the typical application scenario for the present invention.

Based on the prior art problems, we can enumerate the following advantages of present invention:

The present invention detects DNS spoofing servers without relying on third-party mechanisms. Hence, the device using the present invention is able to detect potentially malicious DNS servers without connecting to a secondary DNS server neither using third-party tools.

The present invention is able to detect the software used for the execution of the DNS server. Therefore, it improves user security, because, the user can be aware of the tools used to set the DNS server. Hence, such information can be used, for instance, to detect common tools used for spoofing DNS servers.

The present invention is able to detect a DNS spoofing server regardless of the domain it is spoofing. The present invention performs its detection based on the DNS behavior, rather than the DNS responses content. Therefore, the detection can be performed even if an attacker changes the spoofed domains.

The present invention is able to detect DNS spoofing servers within LAN or WAN scope. The technique extracts the DNS server behavior remotely, therefore, it does not require that the DNS server is executed in LAN scope.

The present invention does not require a signature database to perform its detection. The proposed technique relies on the DNS server behavior and a machine-learning model to detect DNS spoofing servers.

The present invention is able to detect a DNS server spoofing responses of another DNS server. For instance, the technique is able to detect a DNS server with a behavior different from the server it was previously connected. Therefore, the present method is able to detect DNS spoofing servers during a Man-In-The-Middle attack for instance.

The present invention does not require a dedicated hardware to fulfill its goals. The detection process can be readily embedded in resource-constrained devices with little or no battery impact. In Addition, the detection is made by software, requiring only access to the communication channel with the DNS server.

The present invention does not require changes in DNS protocol neither a dedicated architecture to perform its detection. Hence, the proposed technique is able to detect DNS spoofing servers directly in the device executing the invention.

An already known limitation of the invention is that a skilled attacker may use a different DNS server to spoof its responses. For instance, an attacker may execute an application typically used for benign DNS servers used to reply spoofed responses. In such a case, the present invention would detect the DNS server as benign, i.e. running using a benign DNS server application. It is important to note that this is uncommon, since the setup of a benign DNS server demands time and prior knowledge. Nonetheless, in general, attackers use well-known DNS spoofing tools to perform such attack. Hence, the present invention would be able to detect them. Another challenge on the present invention includes training dataset maintenance. If an attacker creates a new tool for DNS spoofing with a high variation from traditional tools, the trained model can fail to detect. The new tool should behave very different when compared with previous tools, since the trained model consider small modification in the behavior.

New Features of Invention

Current security solutions for networked devices are unable to evaluate the DNS server trustworthiness without using third party such as public key infrastructure or secondary DNS server, before performing domain name resolutions. Hence, user devices may be redirected to malicious domains in which are subjected to all sort of attacks, such as connection eavesdropping, download of malicious content, stealing of credentials and sensitive information, among others. Therefore, the present invention tackles the security gap when devices are performing domain name resolutions. This because the present invention enables security solutions to evaluate the DNS server RFC adherence, which, consequently, provides a better metric to classify and recognize a DNS server. Hence, security solutions can better evaluate the DNS server trustworthiness, thus, improving user security. To achieve such goal, the present invention actively classifies and recognizes DNS server behavior according to the messages replied from it after specially crafted queries were sent.

Once all steps of the invention are successfully completed, the method of the present invention provides the device enriched information regarding the DNS server trustworthiness. As an example, the method of the present invention is able to recognize whether the DNS server application is well-known and trusted or unknown and potentially spoofed server. This method also adds the possibility to classify the software used for setting a DNS server, e.g. software usually used for benign purposes such as dnsmasq or bind9, or even malicious purposes such as Ettercap or dnsspoof.

Therefore, when using this invention, a device will be able to detect malicious and consequently spoofed DNS servers without relying in third-party mechanisms. Hence, the present invention provides value to the market, as it can be readily used in current and future devices without any hardware changes, and with small computational resource demands.

The attached drawings will be described in detail with mention to the reference numbers in them whenever as possible. The specific examples used throughout the specification are used only for clarification purposes and are not intended to limit the applicability of the present invention.

An application scenario of the present invention is shown in FIG. 1. The scenario includes a device (101) and a DNS server (102). The device communicates with the DNS server using a wired or wireless communication link. Both device and DNS server communicate using a common and shared protocol, as defined in the DNS protocol specification. The device and DNS server may be in the or in different networks. The device must be able to communicate with the DNS server. Overtime, the device may perform domain resolutions to a DNS server. To achieve such goal, the device sends a DNS query message (103) to the DNS server. In counterpart, the DNS server replies it by sending a DNS response (104). In the present invention, it is expected that the DNS server reply to the received DNS queries over time. If the query is not answered in a period, a timeout expires, and it is assumed as no answer.

Figure 2:
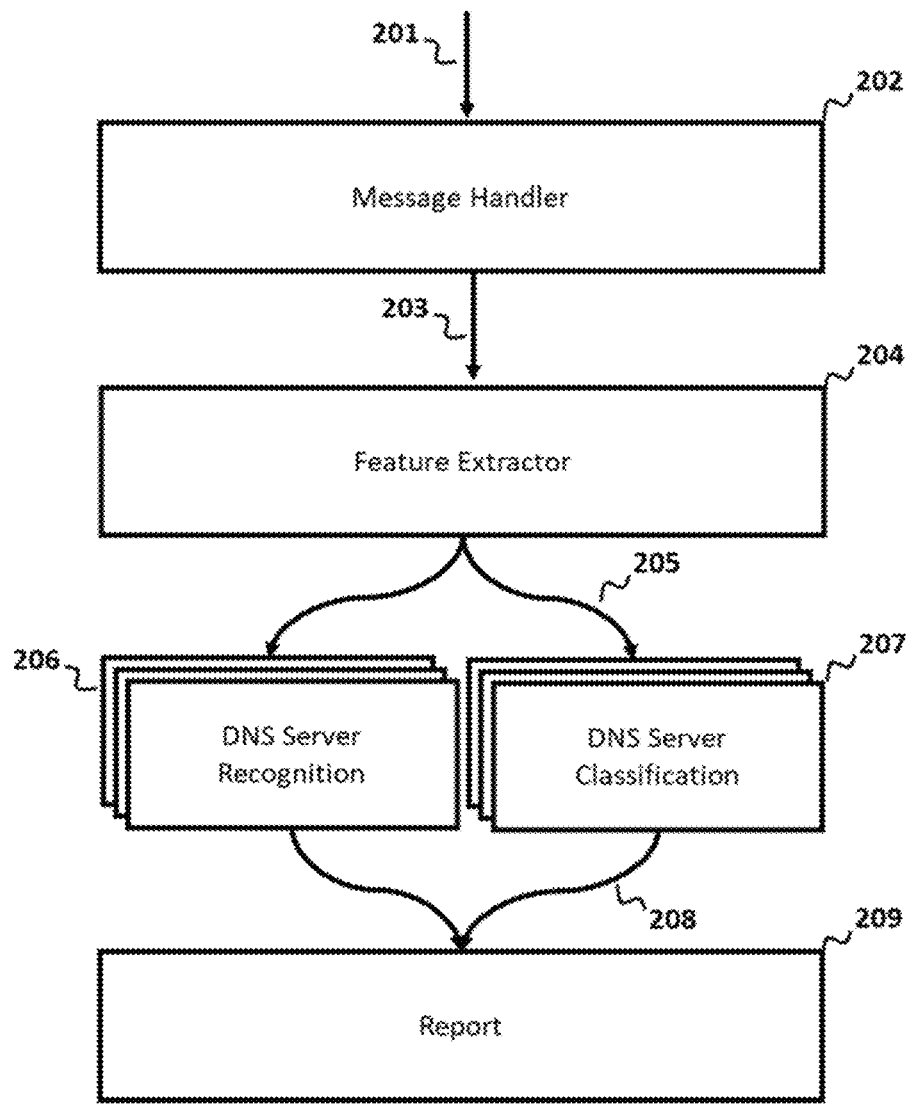
FIG. 2 shows the information flow for the present method.

FIG. 2 illustrates the present invention information flow. The present invention is executed in a device. The information flow starts with the device calling the present invention method (201). The invention calling can be executed after a specific event is triggered. For instance, the device may be connected to a new network, or the used DNS server may have changed its address. Hence, a typical usage scenario for the invention is regarding DNS server changes, since the device may desire to reevaluate the newly connected DNS server. After the present invention is called, the Message Handler module is executed (202).

The goal of the message handler module is to send and receive DNS query and DNS response messages to the DNS server. Therefore, the message handler module sends a set of DNS queries to the DNS server. Each DNS query is specially crafted to validate a specific Request-For-Comment (RFC) specification of the DNS protocol. Consequently, each DNS query must generate a DNS response by the DNS server as a counterpart. For example, a specially crafted DNS query can be a query to a "onion" domain, which, according to RFC 7686 must be replied with a NXDOMAIN by the DNS server. Hence, the message handler module is executed until all the specially crafted DNS queries were performed or a time interval has passed. The time interval expiration goal is to determine whether the DNS server replies to a specific DNS query or not. For instance, a spoofed DNS server may not reply to a DNS query made using TCP protocol, which according to RFC 7766 all servers must provide support. After the execution of all specially crafted DNS queries, gathering of all DNS replies, or time interval has expired, the messages (203) are forwarded to a Feature Extraction module (204).

The goal of the feature extraction module is to build the feature vector to be used for classification and recognition purposes. To this end, the feature extraction module receives as input a set of DNS responses and outputs a feature vector. Hence, the feature extraction module must be able to interpret the DNS message network protocol. The feature extraction module, for each feature that compounds the feature set, performs the extraction of feature value over the DNS response or a set of DNS responses. In other words, the feature extraction module may extract a feature directly from a single DNS response, or after the analysis of several DNS responses. As an example, a feature that requires the analysis of several DNS responses is the Time-To-Live (TTL) value analysis, which according to the RFC 1035 must be decremented only for non-authoritative name servers. Feature values varies according to the analyzed DNS response. A feature value may be represented using a numerical or categorical value. An example of numerical value includes, but are not limited to, the standard deviation of TTL values. An example of categorical values includes, but are not limited to, adheres RFC standard, does not adhere to RFC standard, or no response from server. After the extraction of all features, the feature set is forwarded (205) to the DNS Server Recognition module (206) and the DNS Server classification module (207).

The DNS Server recognition module receives as input a feature set, and outputs a related DNS server recognized. To fulfill its goal, the DNS Server recognition module applies a machine-learning model that recognizes similarities between its input and a set of known examples in the training data. End-device energy consumption remains unaffected during the model training process, since this step is normally performed in an external device and then ported as an executable binary to the end-device. The recognizer may rely on clustering, classification, distance-based or other machine-learning techniques. For example, a recognizer may use a distance-based algorithm to return the most similar DNS server for a given input. In addition, since the proposed solution will be executed in an end-device, the recognizer must be energy efficient during the classification. Distance or decision based algorithm present low complexity, O(n log n), as examples but no limited as possible candidates for recognizer. Before the message enters to the machine-learning module, the DNS Server recognition module translates the feature set for a proper machine-learning input. As an example, the feature set translation may comprise none, all, or other of the following tasks: normalization, standardization, feature selection, feature reduction, among other pre-processing techniques. For instance, before applying a distance-based machine-learning model, the DNS Server Recognition module may perform feature normalization and feature reduction techniques. After the application of the machine-learning model, the recognized DNS Server is forwarded (208) to a Report module (209).

The DNS Server Classification module applies a machine-learning model that classifies an input into a class. The class refers to a group of a given examples that presents the same properties. For example, a classifier may label an input according to the software used by the DNS server, in such a case the property is the software used by the DNS server. Before applying the machine-learning module, the DNS Server Classification module translates the feature set to a proper machine-learning input. As an example, the feature set translation may comprise none, all, or other of the following tasks: normalization, standardization, feature selection, feature reduction, among other preprocessing techniques. For instance, before applying a classifier machine-learning model, the DNS Server Classification module may perform a feature reduction technique. After the application of the machine-learning model, the labeled DNS Server is forwarded (208) to a report module (209).

Finally, the report module goal is to gather the established DNS server recognized and classified and report it to the corresponding client. As an example, the client may be a security solution used by the device.

Figure 3:
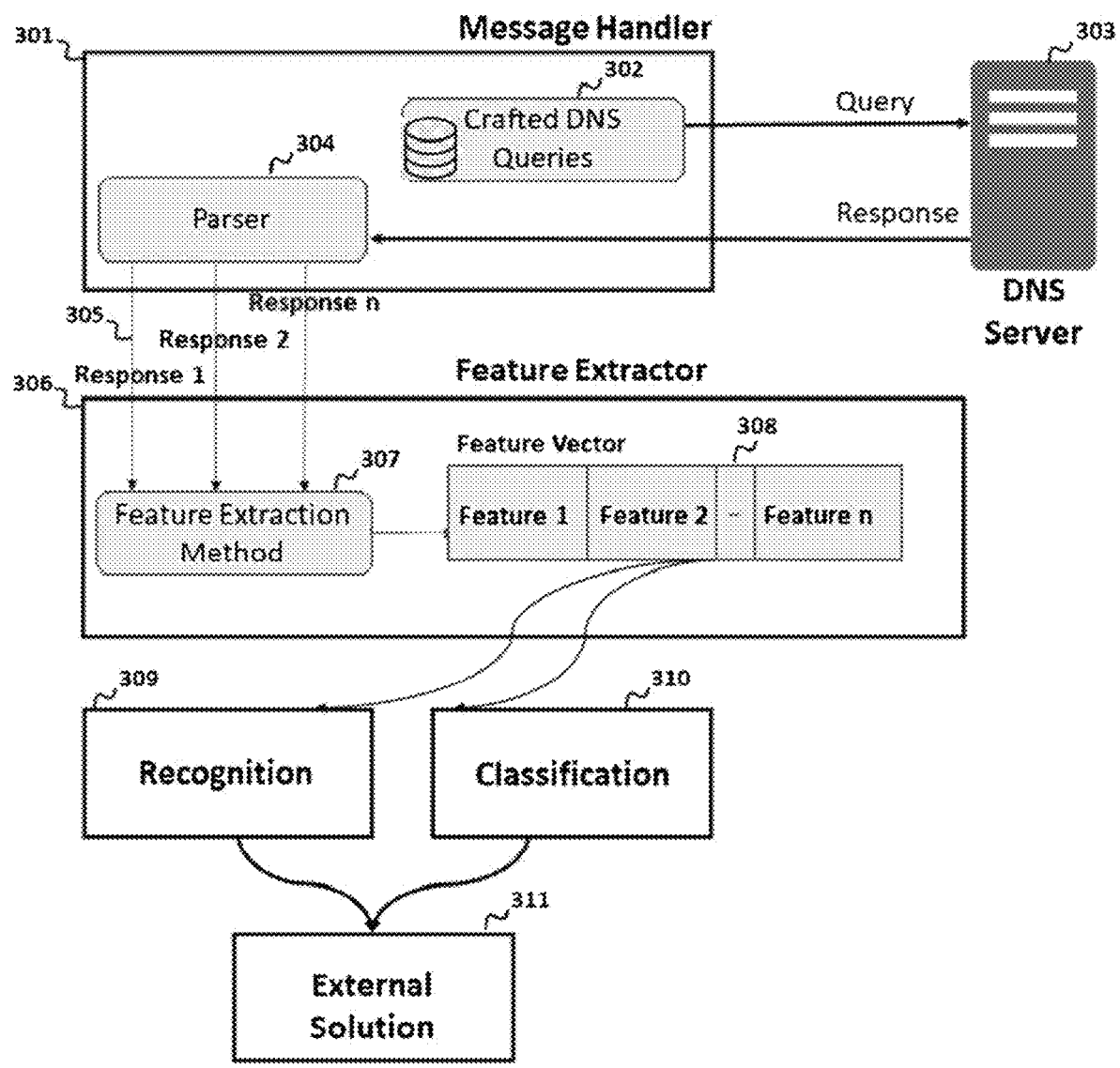
FIG. 3 shows the behavior of each component of the presented method.

The present invention, as shown in FIG. 3, provides a method for detection of spoofed DNS servers using machine-learning techniques comprising:

sending, by a Message Handler module (301), specially crafted DNS queries (302) to be used for evaluation of DNS server (303) of its DNS protocol RFC adherence;

parsing (304), by a Message Handler module, DNS responses (305) from the evaluated DNS server;

extraction of features, by a Feature Extractor (306) module, from the received DNS responses trough the feature extraction method (307), converting them into a feature vector (308) to be used for recognition or classification purposes;

recognition of DNS servers, by a DNS Server Recognition module (309), to be used for external solutions (311);

classification of DNS servers, by a DNS Server Classification module (310), to be used for external solutions (311).

Figure 4:
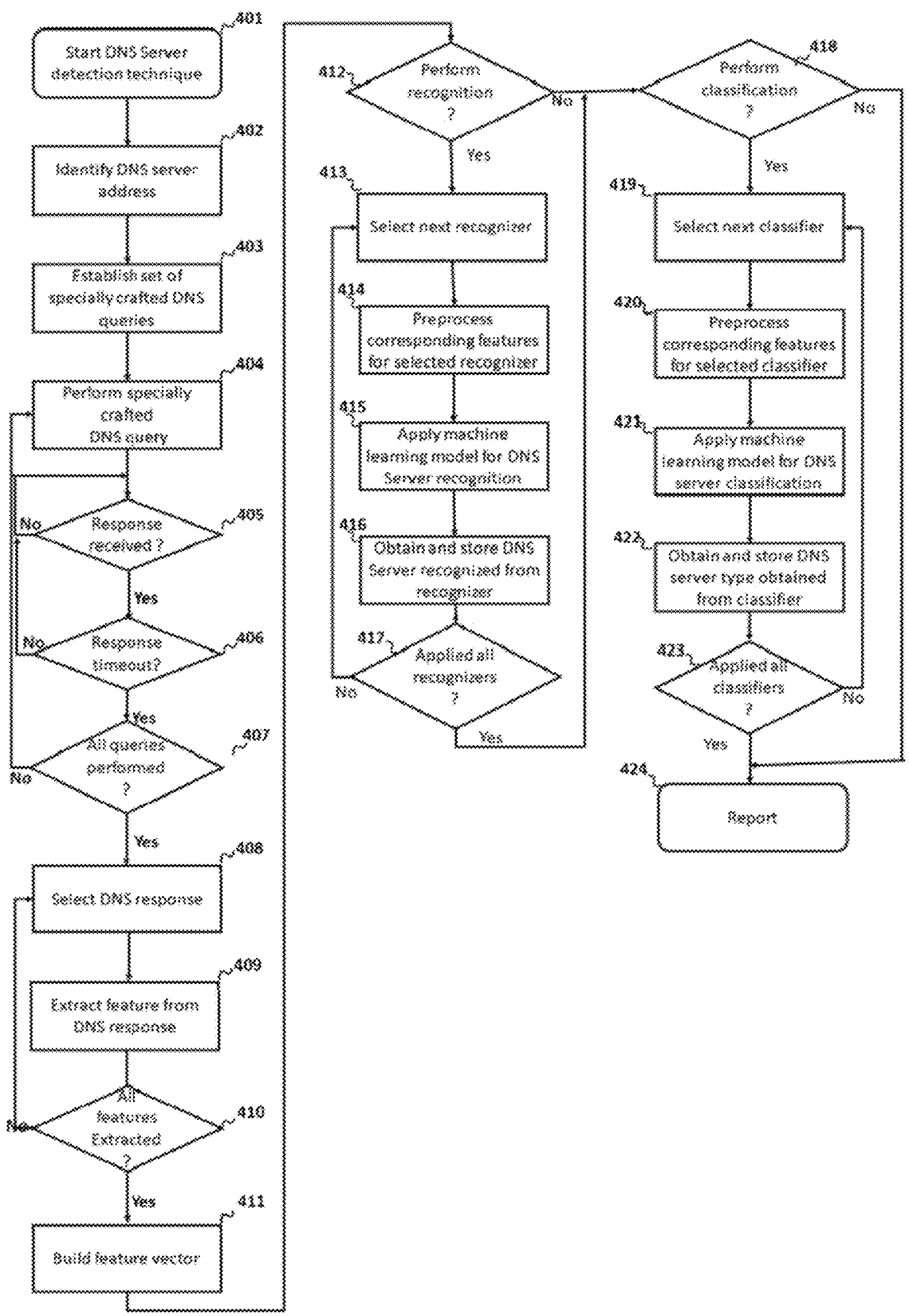
FIG. 4 shows the proposed access point characteristic detection method.

The flowchart of the proposed method for detection of spoofed DNS Servers is illustrated in FIG. 4. The device starts the process after the triggering of an event (401). Examples of events that could trigger the proposed detection method includes, but are not limited to, changes of DNS address, connection to a new DNS address, periodic DNS server validation, among others. Then, the DNS server address are gathered from the device (402). In such a case, all information related to the communication needed between the device and the method must be gathered, in order to enable the proper communication between the entities. Afterwards, the set of specially crafted DNS queries are selected and built (403). Each specially crafted DNS query is used to validate a specific RFC specification from the DNS protocol. Then, the set of DNS queries can be performed. To this end, the invention performs the selected DNS queries (404) and wait for the related DNS server response (405) or a timeout expire (406), until all queries were performed (407). Each performed DNS query can generate a related DNS response or no response. Therefore, an expiration period must be used to ensure that the query has generated a response or not. For the sake of simplicity, in the flowchart, such process is shown sequentially, in which each DNS query is performed after another. However, the invention may also be implemented to perform such task in parallel, performing all queries and waiting for their response only once. When all queries are properly made, the extraction of features can be performed. To achieve such goal, for each DNS response (408) a related feature value must be extracted (409). A feature value comprises the DNS server behavior for the related DNS query made to it. Therefore, each DNS response generates a specific feature value. The feature extraction process is performed until all DNS responses have their feature values obtained (410). When all feature values are extracted, a feature vector is built (411), which then is used for recognition and/or classification purposes. For the sake of simplicity, in the flowchart, such process is shown sequentially, in which the recognition is performed before the classification process. However, the invention may also be implemented to perform such tasks in parallel, or even in the opposite order, performing first the classification task then the recognition task.

If the recognition process is performed (412), it starts with the selection of a proper machine-learning model from the recognizer (413). Proper recognizer's machine-learning models are algorithms used for recognizing DNS server behaviors. With the proper recognizer machine-learning model, the corresponding set of features are selected (414). This process aims to building the feature set according to each recognizer machine-learning model. This process occurs because each model may rely in a different feature set, established according to each model obtainment process. The corresponding set of features building process includes none, all, or some of the process of feature extraction, selection, normalization, standardization, reduction and/or any other preprocessing task needed to properly apply the recognizer machine-learning model. Finally, the recognizer machine-learning model is applied to the built feature set (415). The recognizer machine-learning model outputs a recognized DNS server, which is stored (416) until all recognizers and classifiers are applied. If all recognizers are applied, the classification process begins (417), otherwise the next recognizer is selected, and the process starts again.

If the classification process is going to be performed (418), a classifier is selected between a set of classifiers (419). Similar to the recognition process, a corresponding feature set is built for the selected classifier (420). The feature set building process includes none, all, or some of the process of feature extraction, selection, normalization, standardization, reduction and/or any other preprocessing task needed to properly apply the classifier machine-learning model. With the classifier feature set properly built, the classifier can be applied for the detection of the DNS server type (421). After applying the classifier machine-learning model, its output, the DNS server type, is stored until all classifiers are successfully applied (422). Finally, if all classifiers are applied, the report process can be performed; otherwise, the classification process is executed again, until all classifiers are applied (423).

The report of the recognized DNS server and type is performed when all classifiers and/or recognizers are applied to the selected DNS server (424). The report process starts with the gathering of all detected DNS server recognized and types, obtained when applying the recognizers and/or classifiers. Afterwards, the obtained recognized DNS server and types are reported to the client that started the present invention detection process.

DNS Queries Used to Evaluate the DNS Server

As aforementioned described the DNS server is evaluated whether it follows the RFC specification or not. Hence, a set of queries must be made to it before a decision can be established. In the invention, these queries are called as crafted queries. In essence, a crafted query is similar to a general query. Nevertheless, objectives are different. While general queries are created to resolve a domain name, to verify the geographical location associated to a domain, among others, the crafted queries are created to validate the RFC specification. When we validate a RFC specification, we verify if the DNS protocol is correctly implemented. In the DNS spoofing tools, normally, for easiness, developers do not respect all the DNS protocol implementation. As an example of a general query, a client would like to access Samsung web site. The client will perform a query to the DNS server asking for the IP address to access Samsung website. In this case, a query is a request to resolve "samsung.com" domain and the response from DNS server would be the IP address that belongs to "samsung.com" domain, such as 23.200.54.105.

Table 1 below shows examples of queries used to evaluate the DNS server RFC adherence. Based on the query number 8 of Table 1, as an example of a crafted query, the client will request a domain with all characters in uppercase such as "SAMSUNG.COM", based on the RFC 1035, the DNS server should response also with all characters in uppercase, such as "SAMSUNG.COM" belongs to 23.200.54.105. We verified that this behavior is not followed in the DNS spoofing tools.

Table 1 show some examples of the queries, but are not limited, that may be performed to create the feature vector:

TABLE 1

DNS Queries used to evaluate the DNS Server

| Query Number | RFC | Query | Expected Response |
|---|---|---|---|
| 1 | 1035 | Query with Recursion Desired (RD) flag set | Response with RD flag set |
| 2 | 1035 | Query with RD flag set, and OPCode = 2 | There must be a response with RD flag |
| 3 | 1035 | Query with RD flag set, and Z flag set | Response with Z flag unset |
| 4 | 1035 | Query with RD flag unset | Response with RD flag unset |
| 5 | 1035 | Pointer Record (PTR) Query with RD flag unset | Response with RD flag unset |
| 6 | 1035 | Query with special characters | Response must be code equal 5 (refused) |
| 7 | 1035 | Query with more than 63 characters | Response must be code equal 5 (refused) |
| 8 | 1035 | Case insensitive query | Response must have an answer with all chars upper |
| 9 | 1035 | Inverse query | Server must reply with not implemented, code equal 4 |
| 10 | 1035 | Case insensitive inverse query | Server must reply with not implemented, code equal 4 |
| 11 | 6891 | Query with Option Codes (OPT) | Same OPT must be in response |
| 12 | 6891 | Query with two OPT | Server must reply with code equal 1 |
| 13 | 6891 | Query with OPT Name set as 1 | Server must reply with code equal 1 |
| 14 | 6891 | Query with OPT version set as FF | Server must not reply with code equal 0 |
| 15 | 7686 | Query for .onion query | Server must reply with refused, code equal 5 |
| 16 | 1035 | Query for domain nameservers | Server must reply with a list of nameservers |
| 17 | 1035 | Query for domain start of zone authority | Server must reply with a list of Start of Authority (SOA) |
| 18 | 1035 | Query for domain canonical name | Server must reply with a list of SOA |
| 19 | 1035 | Query for IP PTR | Server must reply with code equal 0, and there must be an answer |
| 20 | 1035 | Query for HostInformation (HINFO) | Server must reply with code equal 0 or 3 |
| 21 | 1035 | Query for Well-Known Services (WKS) | Server must reply with a list of SOA |
| 22 | 7766 | Query for TCP DNS | There must be a reply with code equal 0 |
| 23 | 4033 | Query for DNSSEC | There must be a reply with additional records, a flag in additional records must be set |
| 24 | 1035 | Check inconsistencies between query 1 and 8 | Both queries must return the same IP address |

The feature vector needs at least eleven DNS answers to perform the classification. This is not a limitation from our system, since the more DNS queries are answered the better the classification.

Figure 5:
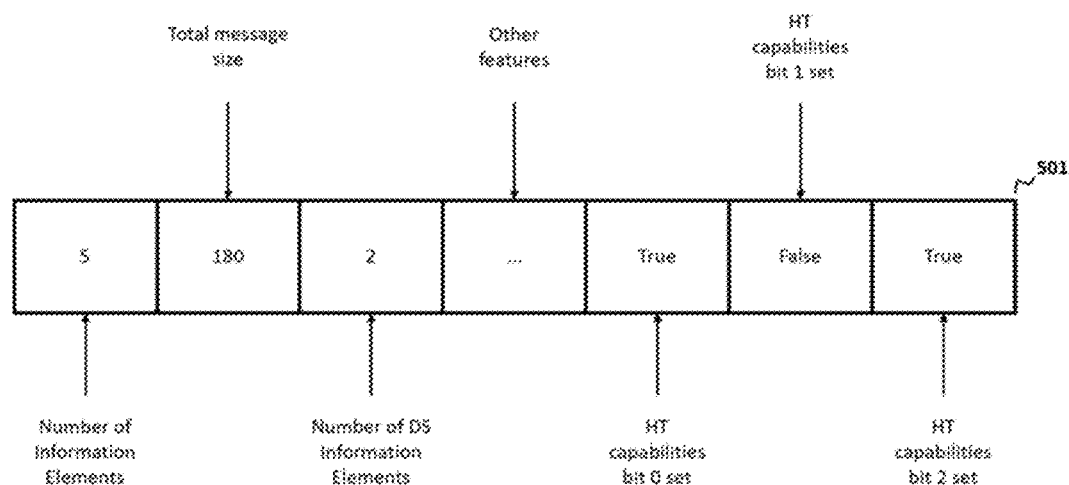
FIG. 5 shows a feature vector extracted from a DNS server.

FIG. 5 shows an example of an extracted feature vector obtained after the feature extraction of a DNS server (501). For the sake of simplicity, only a subset of possible features is shown in the figure, however, other features can be extracted for the detection process. Examples of features that can be extracted from a DNS server include but are not limited to the number of performed queries, number of received responses, RFC adherence, and protocol support, among others. Therefore, feature values can be obtained directly from the message field value, for example, a flag in DNS response packet. In contrast, other feature values can only be obtained after a computational process, for example number of received DNS responses, among others.

Figure 6:
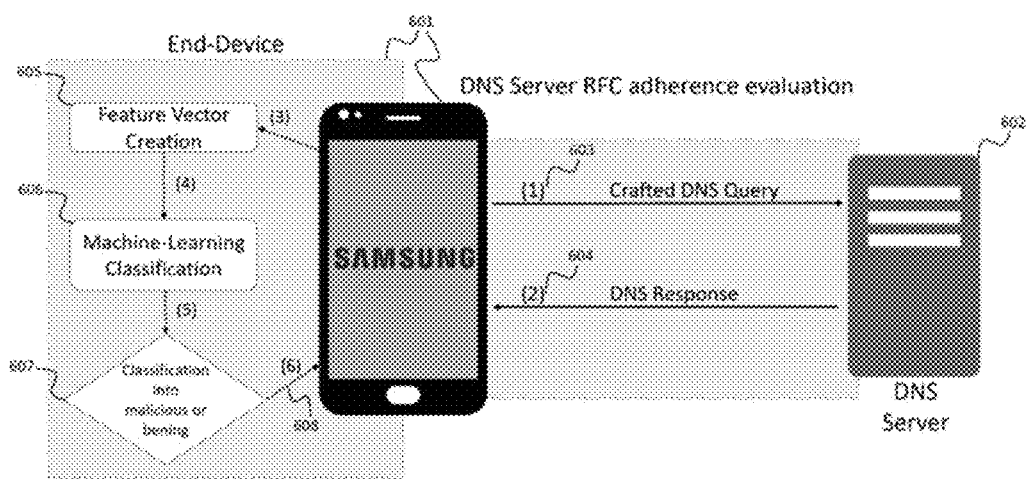
FIG. 6 shows an illustrative embodiment of the present invention.

An illustrative embodiment of the present invention is shown in FIG. 6, in which an end-device (601) verify the behavior of a malicious DNS server (602) based on its RFC adherence. First, the end-device (601) connects to a new AP, receiving a new DNS server address to be used. Then, DNS server to query is received for domain server address. The DNS server adherence to the RFC specification is evaluated and achieved by sending a set of specially crafted DNS queries (603) to the DNS server. After the set of queries is performed, with the DNS responses (604), the end-device builds a feature vector (605) comprising the DNS server adherence to the RFC specification. The feature vector feeds a machine-learning classifier (606) that classifies the DNS Server as either malicious or benign (607). Finally, the classification is sent to the end-device as a pop-up message (608) to be displayed.

Although the present disclosure has been described in connection with certain preferred embodiments, it should be understood that it is not intended to limit the disclosure to those particular embodiments. Rather, it is intended to cover all alternatives, modifications and equivalents possible within the spirit and scope of the disclosure as defined by the appended claims.

What is claimed is:

1. A method for detection of spoofed DNS servers using machine-learning techniques, the method comprising:
    sending, by a Message Handler module, specially crafted DNS queries to be used for evaluation of DNS server DNS protocol Request for Comments (RFC) adherence;
    parsing, by the Message Handler module, DNS responses from the evaluated DNS server;
    extracting, by a Feature Extractor module, features from received DNS responses to be used for recognition or classification purposes;
    recognizing, by a DNS Server Recognition module, DNS servers to be used for external solutions;
    classifying, by a DNS Server Classification module, DNS servers to be used for external solutions; and
    wherein the DNS queries used for evaluation of DNS server DNS protocol Request for Comments (RFC) adherence are categorized among:
        i) adhere to RFC standard;
        ii) does not adhere to RFC standard; or
        iii) no response is received during a timeout interval predefined.

2. The method of claim 1, wherein the sending of the specially crafted DNS queries to be used for evaluation of DNS server DNS protocol RFC adherence comprises:
    building a set of DNS query messages in which each DNS query evaluates the DNS server adherence to a DNS protocol RFC specification; and
    sending the set of DNS query messages over a communication link to the DNS server.

3. The method of claim 2, wherein the parsing of the DNS responses from the evaluated DNS server comprises:
    receiving, over the communication link, a set of DNS server responses; and
    parsing the received set of DNS server responses according to the DNS protocol RFC specification.

4. The method of claim 1, wherein the extracting of the features from the received DNS responses to be used for recognition or classification purposes comprises:
    determining, by the Feature Extractor module, the features to be extracted according to a machine-learning model;
    extracting, by the Feature Extractor module, the features according to the machine-learning model; and
    preprocessing, by the Feature Extractor module, the extracted features according to the machine-learning model.

5. The method of claim 1, wherein the recognizing of the DNS servers to be used for external solutions comprises:
    applying, by the DNS Server Recognition module, a machine-learning model to recognize the DNS servers;
    determining, by the DNS Server Recognition module, the recognized DNS servers according to the applied machine-learning model; and
    assembling, by the DNS Server Recognition module, the set of determined DNS servers.

6. The method of claim 1, wherein the classifying of the DNS Servers to be used for external solutions comprises:
    applying, by the DNS Server Classification module, a machine-learning model for classification of DNS Servers;
    determining, by the DNS Server Classification module, a DNS Server type according to the applied machine-learning model; and
    assembling, by the DNS Server Classification module, a set of DNS Server types.

7. The method of claim 1, wherein the DNS Server is recognized by applying a machine-learning model for recognition purposes.

8. The method of claim 7, wherein the machine-learning model is given as input a set of DNS Server features and outputs a related recognized DNS Server.

9. The method of claim 8, wherein the machine-learning model used for recognition determines the DNS Server recognized.

10. The method of claim 1, wherein a DNS Server type is determined by applying a machine-learning model for classification purposes.

11. The method of claim 10, wherein the machine-learning model is given as input a set of DNS Server features and outputs a DNS Server type.

12. The method of claim 11, wherein the machine-learning model used for classification determines a DNS Server group.

13. The method of claim 1, wherein features of the DNS Server are determined by applying a feature extraction process.

14. The method of claim 13, wherein the feature extraction process is given as input a set of DNS server replies and outputs a DNS Server feature set.

15. The method of claim 14, wherein the feature set is computed by building a feature set by copying message field values or by further processing to establish the feature values.

16. The method of claim 14, wherein messages to be used for the feature extraction process are determined by a Message Handler process, which builds a set of DNS queries, sends the DNS queries to a DNS server, and receives a set of DNS replies, which are used for classification and recognition process.

17. The method of claim 1, further comprising detecting spoofed DNS Servers by machine-learning.

18. The method of claim 1, wherein messages used for at least one of the recognizing and the classifying are collected over the communication link.

19. The method of claim 1, wherein a user determines the spoofed DNS server based on the classifying of the DNS servers.

20. The method of claim 1, wherein the detection of the spoofed DNS server applies a set of machine-learning models for at least one of the recognizing and the classifying.

* * * * *